(12) United States Patent
Anderson

(10) Patent No.: US 12,230,951 B2
(45) Date of Patent: Feb. 18, 2025

(54) BRACKET SYSTEM AND METHOD

(71) Applicant: ERICO International Corporation, Solon, OH (US)

(72) Inventor: Scott Ernest Anderson, Garrettsville, OH (US)

(73) Assignee: ERICO International Corporation, Solon, OH (US)

( * ) Notice: Subject to any disclaimer, the term of this patent is extended or adjusted under 35 U.S.C. 154(b) by 0 days.

(21) Appl. No.: 18/420,153

(22) Filed: Jan. 23, 2024

(65) Prior Publication Data

US 2024/0162699 A1 May 16, 2024

Related U.S. Application Data

(63) Continuation of application No. 18/053,079, filed on Nov. 7, 2022, now Pat. No. 11,881,687, which is a
(Continued)

(51) Int. Cl.
*H02G 3/12* (2006.01)
*E04B 9/20* (2006.01)
(Continued)

(52) U.S. Cl.
CPC ............... *H02G 3/12* (2013.01); *H02G 3/08* (2013.01); *F16M 13/022* (2013.01); *F16M 13/027* (2013.01)

(58) Field of Classification Search
CPC ........... H02G 3/12; H02G 3/08; H02G 3/041; H02G 3/10; H02G 3/123; H02G 3/125;
(Continued)

(56) References Cited

U.S. PATENT DOCUMENTS

| 1,592,990 A | 7/1926 | Raquette et al. |
| 1,777,291 A | 10/1930 | Clayton |

(Continued)

FOREIGN PATENT DOCUMENTS

| EP | 1720227 B1 | 11/2006 |
| WO | 008112285 A1 | 9/2008 |
| WO | 2011097026 A1 | 8/2011 |

(Continued)

OTHER PUBLICATIONS nVent Caddy T-Grid Box Hanger, spec sheet, 1 page, Copyright 2020 nVent.
(Continued)

*Primary Examiner* — Nkeisha Smith
(74) *Attorney, Agent, or Firm* — Quarles & Brady LLP

(57) ABSTRACT

A bracket system for securing an electrical device and other components to a ceiling structure can include a mounting bracket removably securable to a ceiling member and a support bar that removably engages the mounting bracket. The mounting bracket can include a bracket body, a channel structure that defines a channel, a support arm to removably engage the ceiling member, and a locking arm that is moveable relative to the bracket body. The support bar can include a support section and an attachment arm extending integrally from a first end of the support section that can be slidably received within the channel in the insertion direction.

20 Claims, 16 Drawing Sheets

Related U.S. Application Data continuation of application No. 17/021,159, filed on Sep. 15, 2020, now Pat. No. 11,495,952.

(60) Provisional application No. 62/902,238, filed on Sep. 18, 2019.

(51) Int. Cl.
*H02G 3/08* (2006.01)
*H02G 3/10* (2006.01)
*F16M 13/02* (2006.01)

(58) Field of Classification Search
CPC ...... H02G 3/121; H02G 3/126; F16M 13/022; F16M 13/027; E04B 9/006; E04B 9/18; E04B 9/20; B60R 2011/0085; F21V 21/02; F21V 21/03; A47B 97/001
See application file for complete search history.

(56) References Cited

U.S. PATENT DOCUMENTS

| | | | |
|---|---|---|---|
| 1,798,838 A | 3/1931 | Garvin | |
| 1,982,957 A * | 12/1934 | Knell | H02G 3/126 220/3.9 |
| 2,233,731 A | 3/1941 | Louis | |
| 2,299,676 A | 10/1942 | Austin, Jr. | |
| 2,854,205 A | 9/1958 | Kurger | |
| 2,939,669 A | 6/1960 | Pascucci | |
| 3,131,901 A * | 5/1964 | Coleman | H02G 3/126 248/909 |
| 3,190,604 A * | 6/1965 | Jorgensen | F16L 3/006 248/343 |
| 3,816,880 A | 6/1974 | Jacobs | |
| 3,834,658 A * | 9/1974 | Theodorides | H02G 3/125 220/3.9 |
| 3,912,865 A | 10/1975 | Seebinger | |
| 3,987,992 A | 10/1976 | Foflygen | |
| 4,041,657 A | 8/1977 | Schuplin | |
| 4,088,293 A | 5/1978 | Delmore | |
| 4,114,326 A * | 9/1978 | Macuga | E04B 9/006 52/28 |
| 4,403,708 A | 9/1983 | Smolik | |
| 4,481,745 A | 11/1984 | Smits et al. | |
| 5,009,383 A | 4/1991 | Chapman | |
| 5,072,344 A | 12/1991 | Fabbri | |
| 5,253,831 A * | 10/1993 | Theodorides | H02G 3/126 248/225.11 |
| 5,303,885 A | 4/1994 | Wade | |
| 5,435,514 A | 7/1995 | Kerr, Jr. | |
| 5,462,256 A * | 10/1995 | Minick | A61M 39/284 604/153 |
| 5,505,419 A | 4/1996 | Gabrius | |
| 5,516,068 A | 5/1996 | Rice | |
| 5,619,263 A | 4/1997 | Laughlin et al. | |
| 5,630,710 A * | 5/1997 | Tune | A61M 5/172 417/326 |
| 5,658,133 A * | 8/1997 | Anderson | A61M 5/172 73/19.1 |
| 5,758,959 A | 6/1998 | Sieczkowski | |
| 5,857,766 A | 1/1999 | Sieczkowski | |
| 5,868,712 A * | 2/1999 | Briggs | A61M 5/365 417/63 |
| 5,934,631 A | 8/1999 | Becker et al. | |
| 6,004,011 A | 12/1999 | Sieczkowski | |
| 6,283,430 B1 | 9/2001 | Schubert et al. | |
| 6,345,800 B1 | 2/2002 | Herst et al. | |
| 6,461,016 B1 | 10/2002 | Jamison et al. | |
| 6,491,270 B1 | 12/2002 | Pfaller | |
| 6,595,479 B2 | 7/2003 | Johnson et al. | |
| 6,761,341 B2 | 7/2004 | Pfaller | |
| 6,889,943 B2 | 5/2005 | Dinh et al. | |
| 6,956,172 B2 * | 10/2005 | Dinh | H02G 3/125 174/53 |
| 6,967,284 B1 | 11/2005 | Gretz | |
| 7,216,838 B1 | 5/2007 | Gretz | |
| 7,234,674 B2 | 6/2007 | Rippel et al. | |
| 7,240,884 B2 | 7/2007 | Shim | |
| 7,264,214 B2 * | 9/2007 | Oh | A62C 35/68 248/65 |
| 7,271,335 B2 | 9/2007 | Dinh | |
| 7,271,336 B2 | 9/2007 | Dinh | |
| 7,297,870 B1 | 11/2007 | Sartini | |
| 7,355,118 B1 | 4/2008 | Gretz | |
| 7,521,631 B2 | 4/2009 | Dinh | |
| 7,611,498 B2 * | 11/2009 | Hasler | A61M 5/14228 604/151 |
| 7,673,841 B2 | 3/2010 | Wronski | |
| 7,735,794 B1 | 6/2010 | Gretz | |
| 7,735,795 B2 | 6/2010 | Wronski | |
| 7,838,769 B2 * | 11/2010 | Peck | H02G 3/185 174/58 |
| 7,874,539 B2 | 1/2011 | Wright et al. | |
| 8,038,113 B2 | 10/2011 | Fryzek et al. | |
| 8,087,631 B1 | 1/2012 | Gretz | |
| 8,091,721 B1 | 1/2012 | Gretz | |
| 8,240,630 B2 | 8/2012 | Wronski | |
| 8,403,277 B2 | 3/2013 | Neurenberger et al. | |
| 8,616,513 B2 | 12/2013 | Kerr, Jr. | |
| 8,622,361 B2 | 1/2014 | Wronski | |
| 8,702,047 B2 | 4/2014 | Neurenberger et al. | |
| 8,727,582 B2 | 5/2014 | Brown et al. | |
| 8,889,984 B2 | 11/2014 | Korcz et al. | |
| 8,967,575 B1 | 3/2015 | Gretz | |
| 8,986,252 B2 * | 3/2015 | Cummings | A61M 5/14232 417/477.2 |
| 9,004,421 B2 | 4/2015 | Feenstra | |
| 9,004,435 B2 | 4/2015 | Wronski | |
| 9,017,297 B2 * | 4/2015 | Travis | A61M 39/287 604/250 |
| 9,060,920 B2 * | 6/2015 | Hirabuki | A61J 1/2089 |
| 9,062,837 B2 | 6/2015 | Wronski et al. | |
| 9,068,722 B2 | 6/2015 | Wronski et al. | |
| 9,261,120 B2 | 2/2016 | Colangelo et al. | |
| 9,285,074 B2 | 3/2016 | Krocz et al. | |
| 9,337,635 B2 | 5/2016 | Korcz et al. | |
| 9,447,950 B1 | 9/2016 | Wronski et al. | |
| 9,470,360 B2 | 10/2016 | Korcz et al. | |
| 9,494,307 B2 | 11/2016 | Wronski et al. | |
| 9,627,867 B2 | 4/2017 | Korcz et al. | |
| 9,689,541 B2 | 6/2017 | Wronski | |
| 9,696,021 B2 * | 7/2017 | Wronski | F21V 21/048 |
| 9,735,557 B1 | 8/2017 | Gretz | |
| 9,822,926 B2 | 11/2017 | Nikayin et al. | |
| 9,887,524 B1 * | 2/2018 | Gretz | H02G 3/081 |
| 9,899,817 B2 | 2/2018 | Korcz et al. | |
| 10,001,270 B2 | 6/2018 | Wronski et al. | |
| 10,006,618 B2 | 6/2018 | Wronski et al. | |
| 10,113,723 B2 | 10/2018 | Wronski et al. | |
| 10,135,232 B2 | 11/2018 | Nikayin et al. | |
| D841,432 S | 2/2019 | Nikayin et al. | |
| 10,333,288 B2 | 6/2019 | Korcz et al. | |
| 10,361,547 B2 | 7/2019 | Kellerman | |
| 10,603,480 B2 * | 3/2020 | Sullivan | A61M 39/12 |
| 10,619,765 B2 * | 4/2020 | Dafonseca | F16L 3/24 |
| 11,045,599 B2 * | 6/2021 | Schieve | A61M 5/142 |
| 11,168,834 B2 | 11/2021 | Roberts | |
| 11,495,952 B2 | 11/2022 | Anderson | |
| 11,707,615 B2 * | 7/2023 | Baier | A61M 39/287 604/153 |
| 2004/0182592 A1 | 9/2004 | King et al. | |
| 2005/0067546 A1 | 3/2005 | Dinh | |
| 2005/0247842 A1 | 11/2005 | Wronski | |
| 2006/0192067 A1 * | 8/2006 | Oh | F16L 3/245 248/342 |
| 2010/0108839 A1 | 5/2010 | Ringenbach | |
| 2010/0252552 A1 * | 10/2010 | Nikayin | H02G 3/123 220/3.7 |
| 2012/0018600 A1 | 1/2012 | Kerr, Jr. | |
| 2012/0191059 A1 * | 7/2012 | Cummings | A61M 39/281 604/257 |

(56) References Cited

U.S. PATENT DOCUMENTS

| | | | |
|---|---|---|---|
| 2013/0138074 A1* | 5/2013 | Travis | A61M 39/287 |
| | | | 604/151 |
| 2014/0238717 A1 | 8/2014 | Korcz et al. | |
| 2015/0202362 A1* | 7/2015 | Wolff | G06F 1/1681 |
| | | | 604/152 |
| 2015/0316177 A1 | 11/2015 | Knutson et al. | |
| 2016/0126711 A1 | 5/2016 | Colangelo et al. | |
| 2017/0165414 A1* | 6/2017 | Schieve | A61M 5/142 |
| 2017/0229852 A1 | 8/2017 | Jones et al. | |
| 2017/0281865 A1* | 10/2017 | Wells | A61M 5/14228 |
| 2018/0100607 A1 | 4/2018 | Dafonseca et al. | |
| 2018/0292076 A1 | 10/2018 | Wronski | |
| 2019/0195474 A1 | 6/2019 | Wronski et al. | |
| 2019/0296534 A1 | 9/2019 | Kellerman | |
| 2019/0376544 A1 | 12/2019 | Davis | |
| 2019/0393688 A1 | 12/2019 | Laughlin et al. | |
| 2021/0048144 A1 | 2/2021 | Fehr et al. | |
| 2022/0282804 A1* | 9/2022 | Davis | F16B 5/0628 |
| 2023/0066965 A1* | 3/2023 | Yu | H02G 3/126 |

FOREIGN PATENT DOCUMENTS

| | | |
|---|---|---|
| WO | 2015057260 A1 | 4/2015 |
| WO | 2016168402 A1 | 10/2016 |
| WO | 2018100329 A1 | 6/2018 |

OTHER PUBLICATIONS nVent Caddy Heavy Duty T-Grid Box Hanger, spec sheet, 2 pages, Copyright 2020 nVent.

nVent Caddy Adjustable T-Grid Box Hanger, spec sheet, 1 page, Copyright 2020 nVent.

Britclips Support Steel-T-Grid Box Hanger Support, product sheet, 3 pages, <https://www.cmwltd.co.uk/cable-containment-systems/britclip-fixings/britclips-support-steel-t-grid-box-hanger-support-each>.

Eaton Fasteners B-Line Series, product catalog, 252 pages, Copyright 2018 Eaton.

SSB-TBAR Simple Support Bracket with T-Bar Drop Ceiling Mounting Clips, screen shot of product description, 1 pages, Copyright 2020 Orbit Industries Inc.

Topaz Heavy Duty T-Grid Box Hanger with Mounting Clip, product sheet, 1 page.

Skil Zone Home Improvement Videos, How to Install Recessed Lighting, <https://www.youtube.com/watch?app=desktop&v=6jEuRzLRbXY>, Sep. 20, 2010.

nVent Caddy Glider Electrical Box Attachment, Screwless, product sheet, 1 page, Copyright 2020 nVent.

Arlington Specialty Boxes, product catalog, 35 pages, www.aifittings.com.

* cited by examiner

BRACKET SYSTEM AND METHOD

CROSS-REFERENCE TO RELATED APPLICATIONS

This application claims priority to U.S. Provisional Patent Application No. 62/902,238, filed on Sep. 18, 2019, to U.S. patent application Ser. No. 17/021,159, filed on Sep. 15, 2020, and to U.S. patent application Ser. No. 18/053,079, filed on Nov. 7, 2022, which are each titled Bracket System for Mounting Electrical Boxes and the entireties of which are incorporated herein by reference.

BACKGROUND

In many applications, it may be useful to support electrical boxes and other components. For example, some applications may require electrical boxes to be supported at particular heights within ceiling structures.

SUMMARY

Some embodiments of the invention provide a method for manufacturing a bracket system that secures an electrical device to a ceiling structure. The method can include forming a mounting bracket of the bracket system that can be configured to be removably secured to a ceiling member of the ceiling structure by forming a bracket body of the mounting bracket, integrally forming with the bracket body a channel structure that can define a channel of the mounting bracket, integrally forming with the bracket body a support arm that can define an opening to removably engage the ceiling member, and integrally forming a locking arm with the bracket body that can be movable relative to the bracket body and the channel between first and second alignments relative to the channel.

Some embodiments of the invention provide a method of securing an electrical device to a ceiling structure. The method can include securing a first mounting bracket of a bracket system to a first ceiling member of the ceiling structure and securing a second mounting bracket of the bracket system to a second ceiling member of the ceiling structure, and slidably inserting a first attachment arm of a support bar of the bracket system into a first channel structure of the first mounting bracket and a second attachment arm of the support bar into a second channel structure of the second mounting bracket. The first attachment arm can extend integrally from a first end of a support section of the support bar and the second attachment arm can extend integrally from a second end of the support section. The method can further include securing the first attachment arm at a selected first height of a plurality of first heights relative to the first mounting bracket with an integrally formed first locking arm of the first mounting bracket that biasingly engages one of a plurality of first openings of the first attachment arm that corresponds to the selected first height, securing the second attachment arm at a selected second height of a plurality of second heights relative to the second mounting bracket with an integrally formed second locking arm of the second mounting bracket that biasingly engages one of a plurality of second openings of the second attachment arm that corresponds to the selected second height, and securing the electrical device to the support section of the support bar.

Some embodiments of the invention provide a bracket system for securing an electrical device to a ceiling structure that includes a ceiling member. The bracket system can include a mounting bracket that can be removably securable to the ceiling member and a support bar that can removably engage the mounting bracket. The mounting bracket can include a bracket body, a channel structure that can extend integrally from the bracket body and can define a channel of the mounting bracket, a support arm that can extend integrally from the bracket body and can removably engage the ceiling member, and a locking arm that can extend integrally from the bracket body and can be movable relative to the bracket body. The support bar can include a support section that can be configured to support the electrical device and an attachment arm that can extend integrally from a first end of the support section and can be slidably receivable within the channel of the mounting bracket in an insertion direction. The channel structure of the mounting bracket can extend discontinuously along the insertion direction and can include at least two guide tabs that can extend integrally from the bracket body to collectively define the channel.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
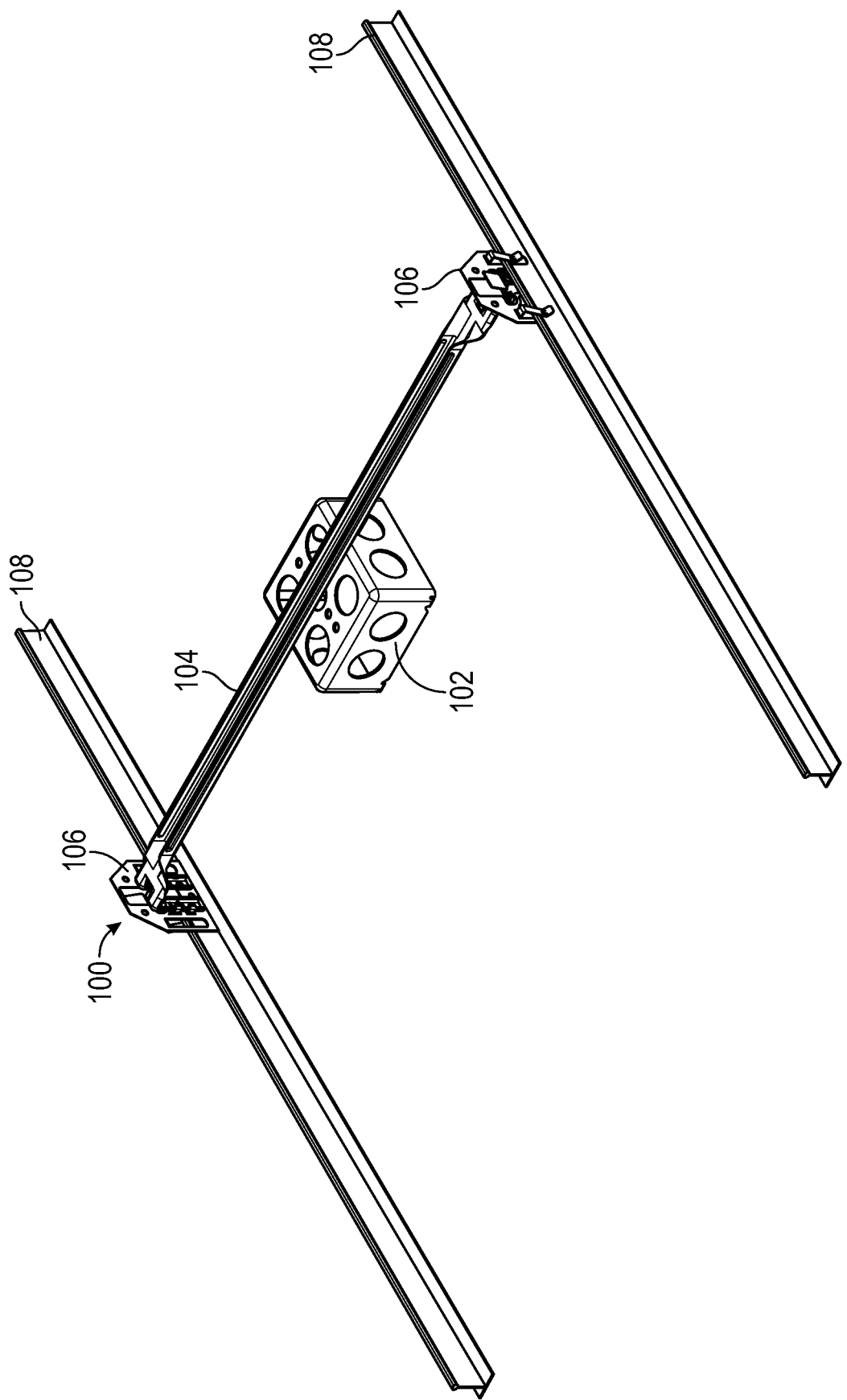
FIG. 1 is a top isometric view of a ceiling structure and a bracket system according to an embodiment of the invention, in an example installation, the bracket system including a mounting bracket and a support bar, and the ceiling structure including a ceiling member.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise specified or limited, directional terms are presented only with regard to the particular embodiment and perspective described. For example, reference to features or directions as "horizontal," "vertical," "front," "rear," "left," "right," and so on are generally made with reference to a particular figure or example and are not necessarily indicative of an absolute orientation or direction. However, relative directional terms for a particular embodiment may generally apply to alternative orientations of that embodiment. For example, "front" and "rear" directions or features (or "right" and "left" directions or features, and so on) may be generally understood to indicate relatively opposite directions or features.

Also as used herein, unless otherwise specified or limited, "lateral" indicates a direction that is transverse to a reference direction. Correspondingly, as used herein relative to adjustable brackets, a "lateral" direction generally refers to a direction that is transverse to the direction of adjustment. In this regard, for example, for bracket systems that provide for vertical adjustment of support bars or other structures, a "lateral" direction is a direction that is transverse to the vertical direction (e.g., the horizontal direction).

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As noted above, in some contexts, it may be useful to secure or support components relative to certain structures. For example, electrical components, such as electrical boxes, may need to be mounted in a ceiling structure. Conventional mounting assemblies commonly use fasteners to secure a support bar to areas of a ceiling structure, and, thus, the support bars of conventional mounting assemblies are often configured only to be installed at a fixed height. Accordingly, any components secured to that support bar may be limited to a predetermined height, such as may be required to ensure alignment with other ceiling structures (e.g., ceiling tiles) which may limit component compatibility. Embodiments of the invention can help alleviate this issue, and others. For example, embodiments of the invention may provide a mounting bracket that can be used to selectively secure a support bar or other support body at any of a plurality of heights relative to a ceiling structure. Embodiments of the invention may also provide a mounting bracket and a support body that can be secured to a ceiling structure without additional hardware, such as fasteners.

In some embodiments, the present invention may provide a mounting bracket for adjustably securing an electrical device or other object to a ceiling structure. The mounting bracket may include a bracket body that is configured to receive portions of the ceiling structure. For example, the mounting bracket may include channels that, together with the bracket body, are configured for removably and adjustably receiving and securing an attachment arm of a support body (e.g., a support bar that extends across the ceiling structure).

Generally, as referred to herein, a channel can be a geometric aspect of a component that bounds a region on at least three sides along an extended axial distance, as defined by a channel structure (e.g., above, below, and to either side of the region from a perspective along the axial direction). Correspondingly, a channel profile refers to the particular geometric profile of part or all of a particular channel. In some cases, a channel may include a closed channel profile, with channel structures that extend continuously along at all sides of the channel over an overlapping axial distance to fully enclose the channel over the overlapping axial distance. In some cases, a channel may include an open channel profile, with channel structures that do not fully enclose the channel over a particular axial distance (e.g., the entire channel). In some cases, an open channel profile may be defined by channel structures that extend along only two or only three sides of the channel over an overlapping axial distance. Relatedly, some channel profiles may be continuous, with channel structures extending continuously over an entire axial length of a channel, whereas other channel profiles may be discontinuous, with channel structures not extending continuously over an entire axial length of a channel.

Some embodiments of the invention may provide a mounting bracket that defines an open channel profile. Some embodiments may have a discontinuous channel profile. In some cases, a combination of these aspects may be possible—i.e., an open, discontinuous channel profile—such as, for example, a channel profile that is not fully enclosed over its entire axial length and does not bound a region on at least three sides along the axial length. This may allow for relatively efficient manufacturing, as well as relatively easy adjustment of an associated support bar or other body. In some embodiments, channels or channel profiles of mounting brackets may be defined by integrally formed features of a bracket body, including stamped tabs with free ends, or the like, alone or in combination with one or more main portions of the bracket body.

Generally, a channel on a mounting bracket according to embodiments of the invention may be configured to receive and secure an attachment arm of a ceiling structure at a plurality of orientations along the channel. Correspondingly, a channel may generally define an insertion axis, which may be a central axis extending in an axial direction defined by the channel, and an attachment arm of a ceiling structure may be configured for insertion and adjustment along the insertion axis. In some embodiments, one or more resilient arms that are biased for securing the attachment arm may be used. For example, a resilient locking arm may be biased toward engagement with an attachment arm that is disposed within a channel of a mounting bracket, so that the locking arm tends to secure the attachment arm at a particular location along the channel unless actively engaged to release the attachment arm. In some embodiments, at least a portion of a locking arm may extend to be aligned with a channel of a mounting bracket such that the locking arm may engage the attachment arm within a channel profile of the channel, or at a location spaced apart from the channel profile in the axial direction, as described in greater detail below.

Embodiments of the invention are presented below in the context of support bars intended to secure electrical boxes to ceiling structures, including T-grid ceiling structures. Correspondingly, some embodiments provide for vertical adjustment of a support bar relative to a mounting bracket and thereby for vertical adjustment of a support bar and an electrical box relative to a ceiling structure. Although these configurations can be particularly useful in some contexts, including due to the particular requirements for mounting electrical boxes to ceiling structures, other configurations are possible. For example, the principles disclosed herein can be used with support bars intended to secure any variety of mountable components, including light fixtures, vents, audio devices, and so on. Further, some embodiments may be configured for adjustment in non-vertical directions, including with a bracket body that is configured to receive and secure one or more arms of a support body at any of a plurality of insertion distances relative to a channel of the bracket body.

Figure 2:
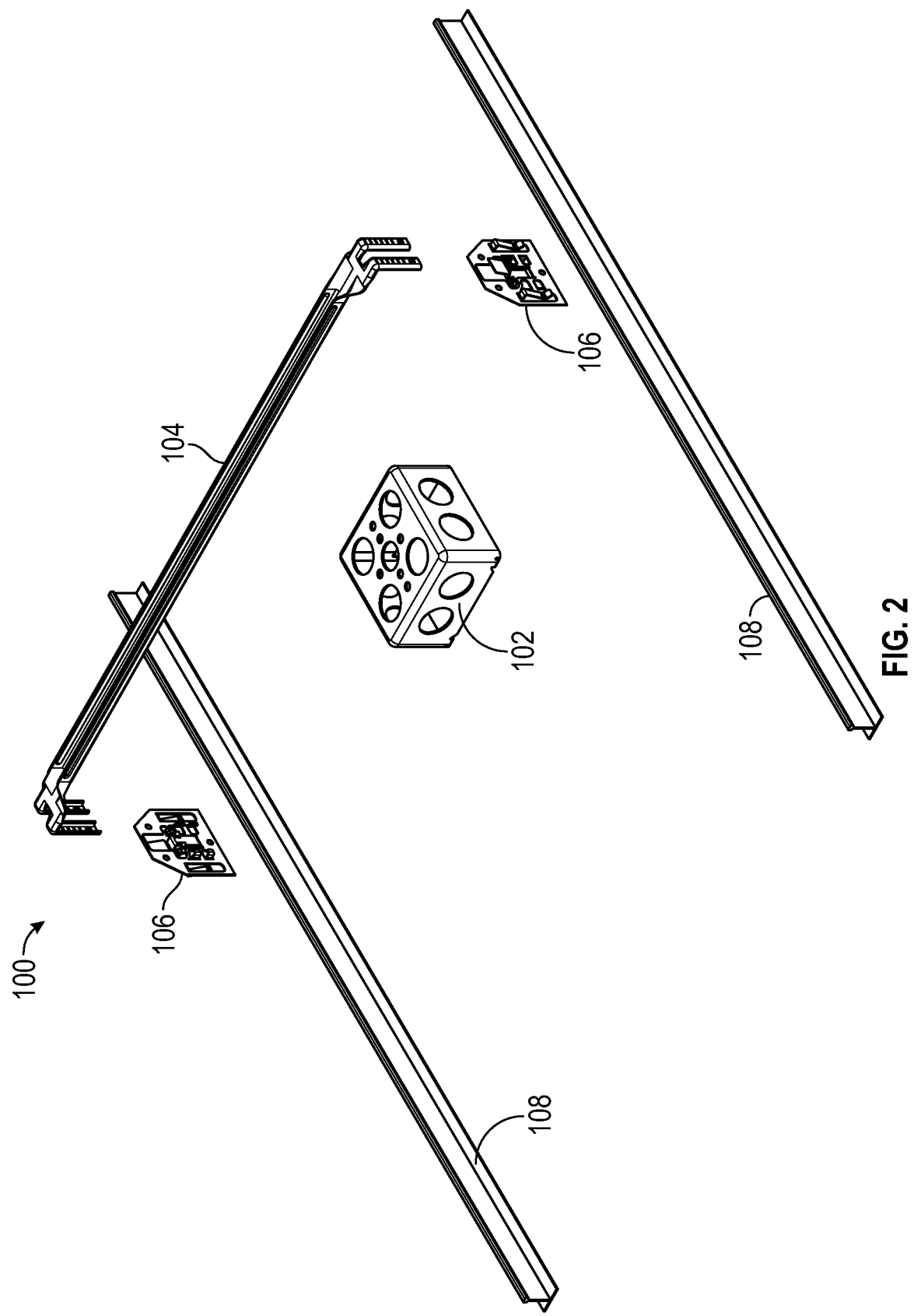
FIG. 2 is an exploded top isometric view of the bracket system and the ceiling structure of FIG. 1.

Referring to FIGS. 1 and 2, embodiments of the present invention generally provide a bracket system for mounting and adjustably securing an electrical box or other object to a ceiling structure (or other building structures) without a need for fasteners, or other added components. For example, in the embodiment illustrated, a bracket system 100 for securing an electrical box 102 includes a support bar 104 and a set of two mounting brackets 106.

In the embodiment illustrated, the mounting bracket 106 is configured such that it may secure the support bar 104 to a ceiling structure, which includes two ceiling members 108 in the embodiment illustrated. Although the bracket system 100 according to the present embodiment is illustrated with two mounting brackets 106, one of ordinary skill in the art would understand that any number of mounting brackets 106 may be used. For example, in some instances, the bracket system may include one, three, or four mounting brackets. Further, in some embodiments, sets of substantially identical mounting brackets can be used to simplify installation procedures and reduce complications for inventory management. In this regard, for example, only one of the mounting brackets 106 will be described in detail below, although some configurations may include multiple types of mounting brackets.

As will be described in greater detail herein, each of the support bar 104, the mounting brackets 106, and the ceiling members 108 are configured so that they may be assembled without additional hardware, such as separate fasteners. Generally, the mounting brackets 106 are configured to be removably secured to the ceiling members 108, and the support bar 104 is configured to be removably and adjustably secured to the mounting brackets 106 in order to support an object (e.g., the electrical box 102) at any of a plurality of heights relative to the ceiling members 108.

Figure 3:
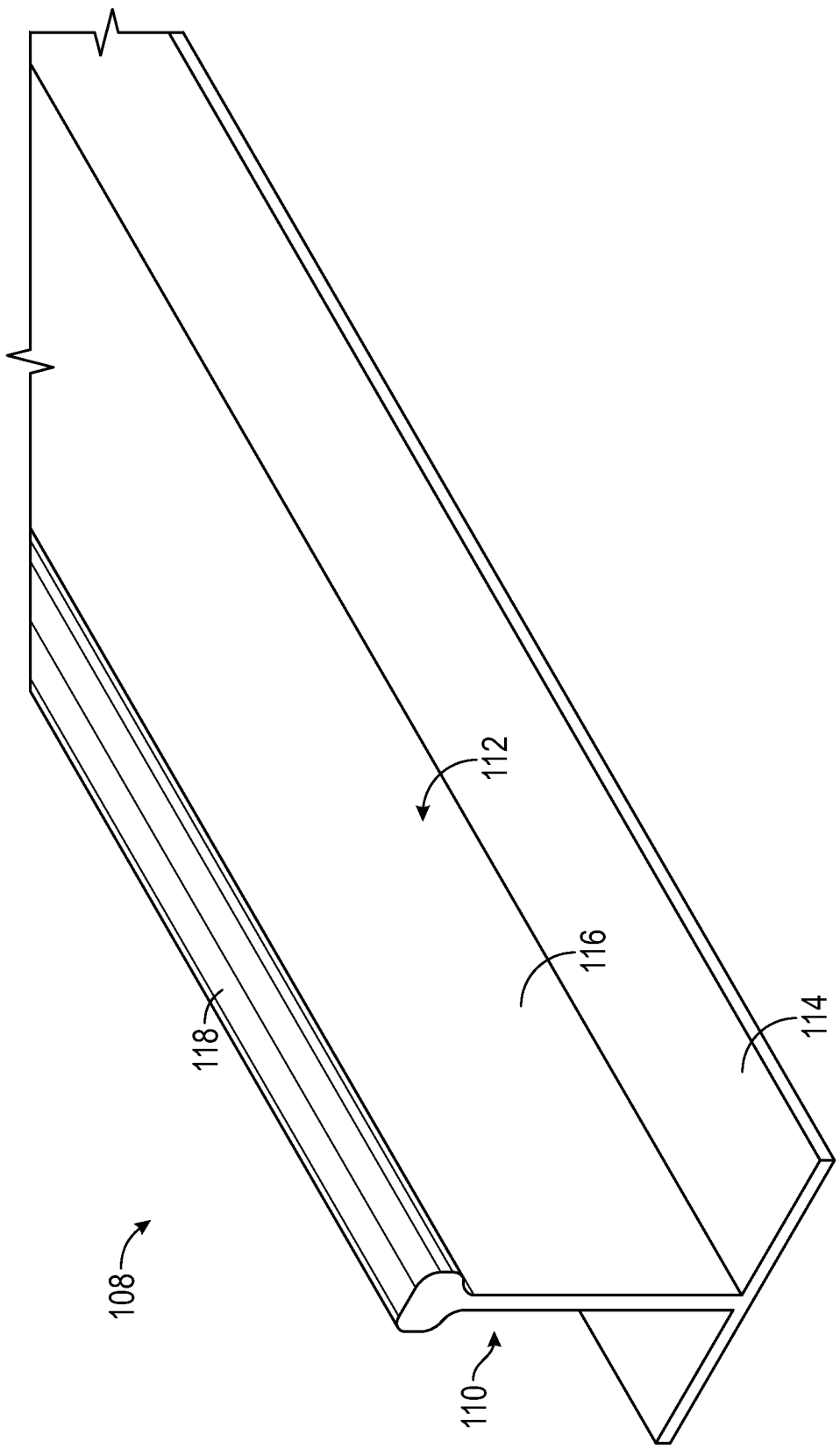
FIG. 3 is a top isometric partial view of the ceiling member of FIG. 1.

In different installations, mounting brackets according to embodiments of the invention can be readily secured to a variety of building (e.g., ceiling) structures. For example, FIG. 3 illustrates aspects of a particular configuration of the ceiling member 108 that may be used with the bracket system 100 of FIGS. 1 and 2. The illustrated ceiling member 108 is provided for example purposes only, and other configurations are possible. In the embodiment illustrated, the ceiling member 108 is a T-grid bar that includes a first side 110, a second side 112, a flat base 114, and a vertical stem 116 extending substantially perpendicularly from the flat base 114 to a widened top 118. However, a variety of other configurations are possible. For example, the bracket system 100 according to the present invention may be configured to mount to any variety of a ceiling member or non-ceiling members.

Figure 4:
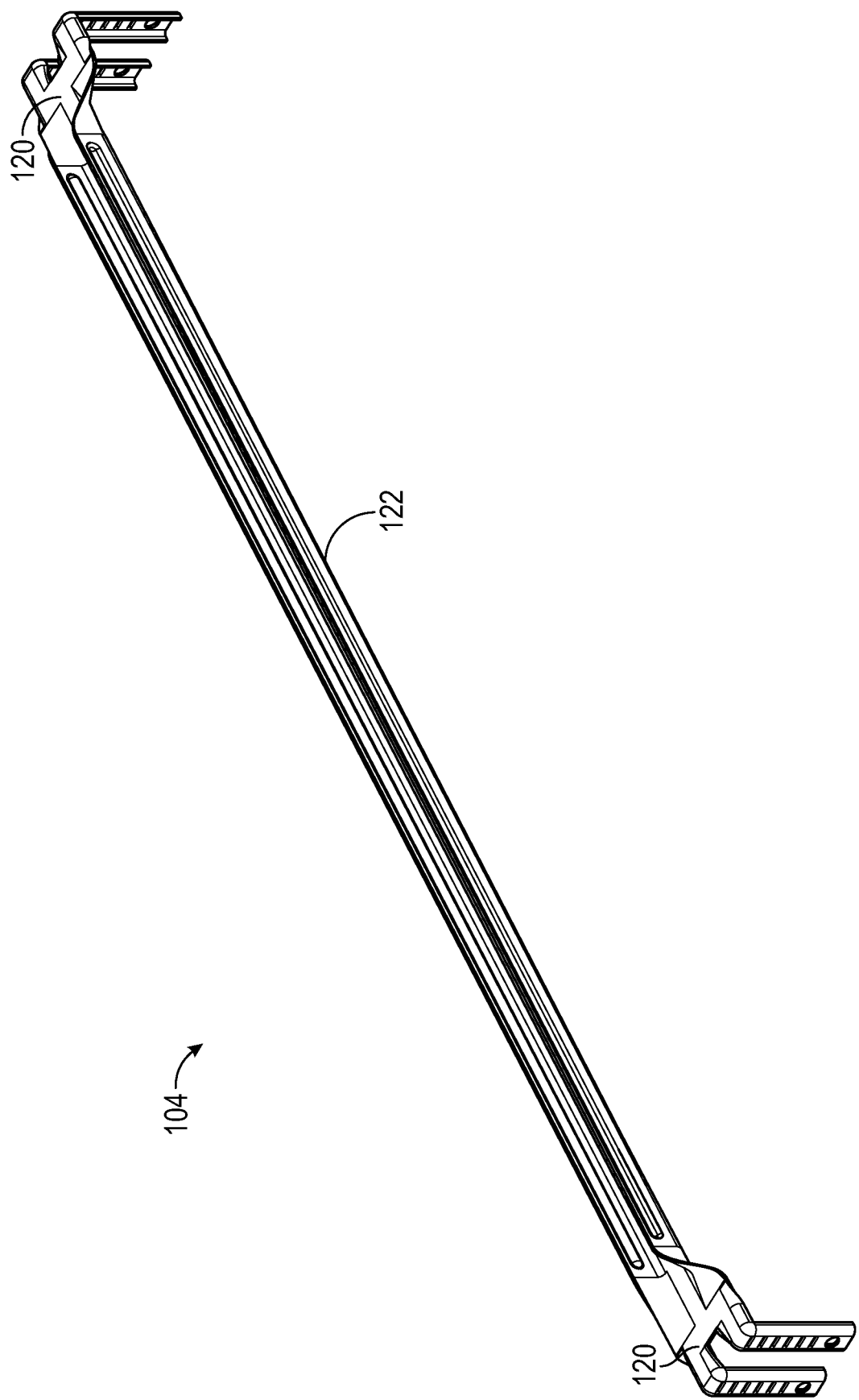
FIG. 4 is a top isometric view of the support bar of FIG. 1.
Figure 5:
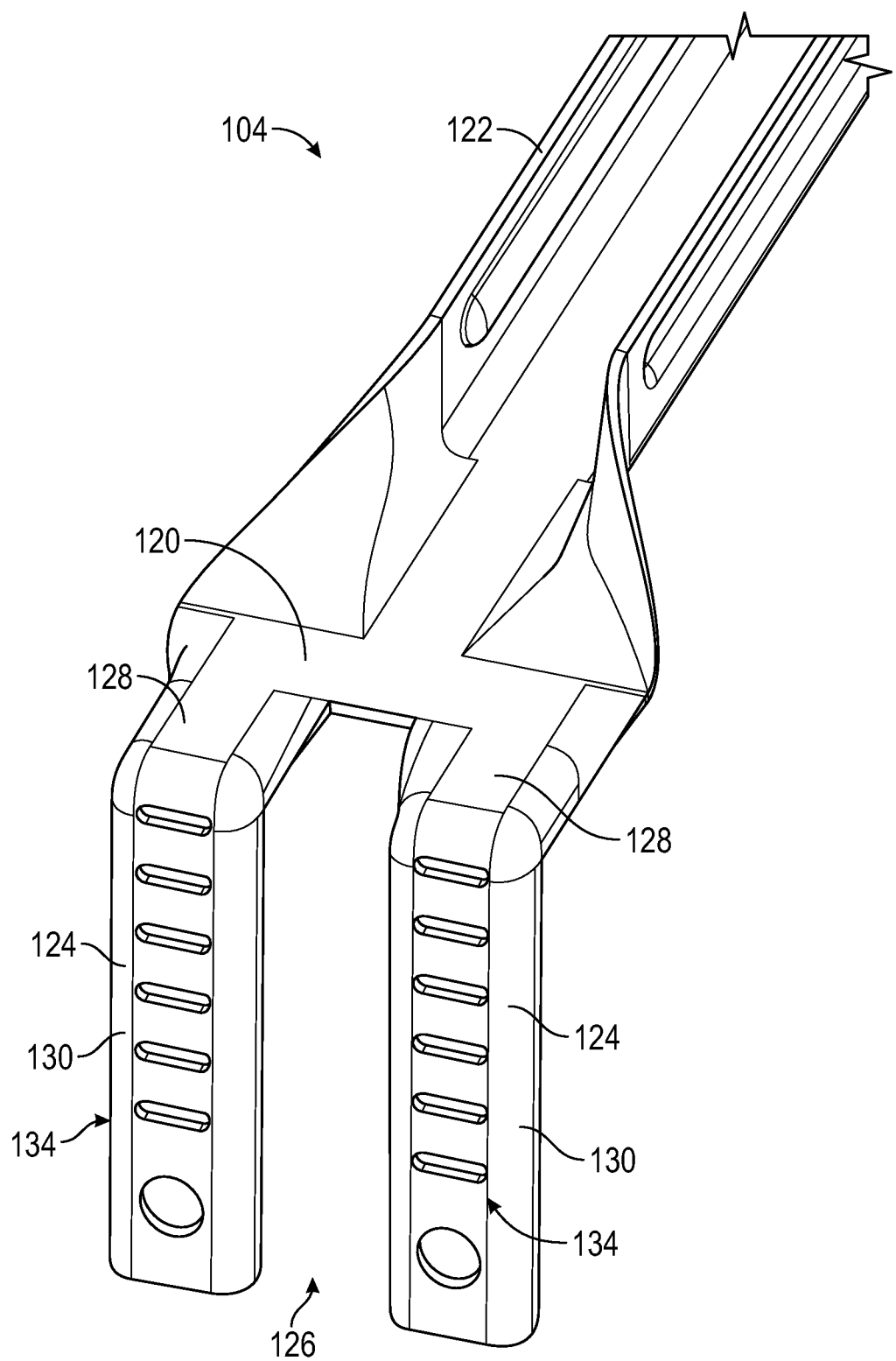
FIG. 5 is a rear isometric partial view of the support bar of FIG. 1.
Figure 6:
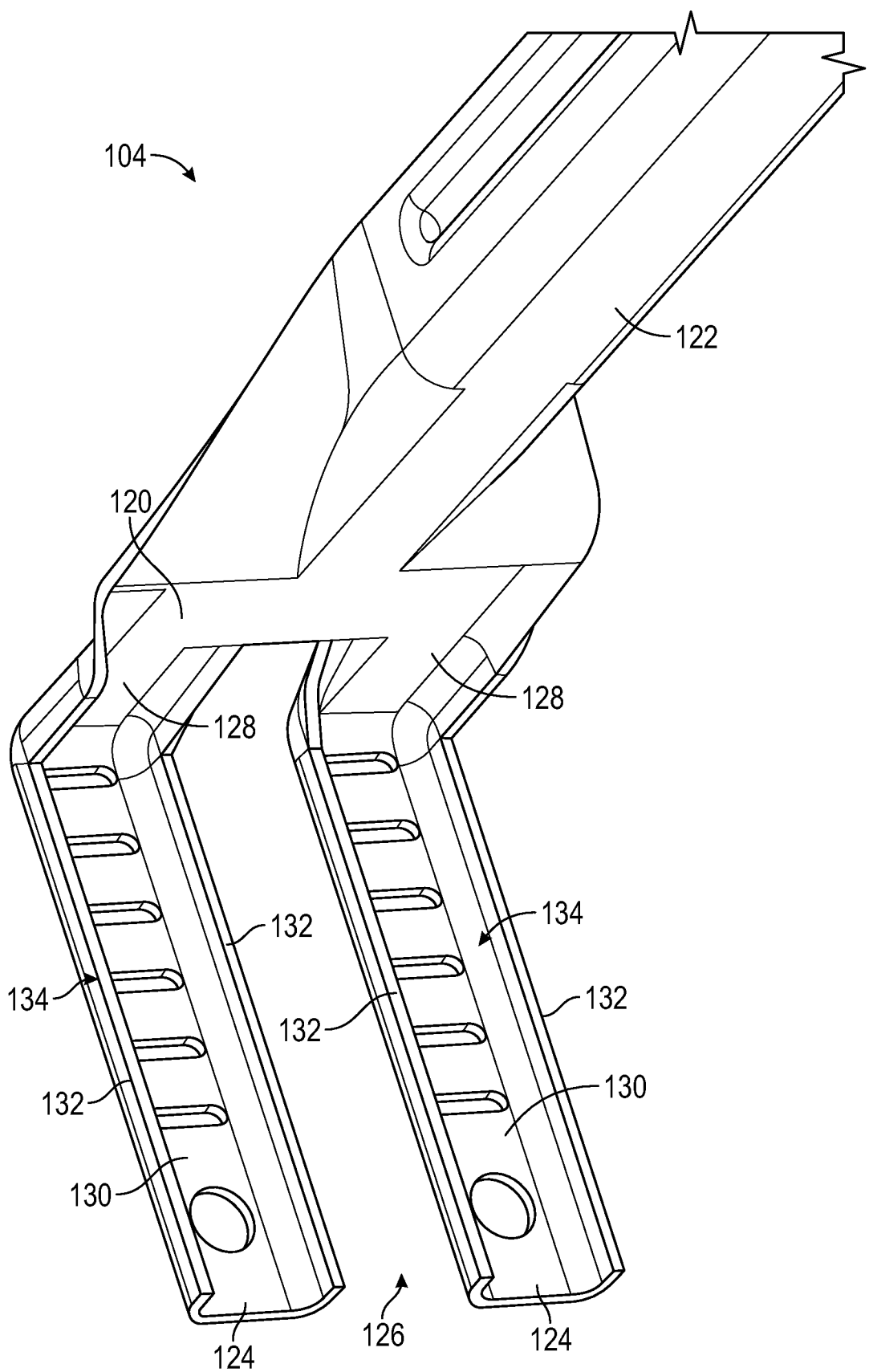
FIG. 6 is a front isometric partial view of the support bar of FIG. 1.

Referring to FIGS. 4-6, the support bar 104 according to the present embodiment includes two ends 120 and a support section 122 that is provided to support components, such as an electrical box. The two ends 120 are symmetrical about the support section 122, and, accordingly, the two ends 120 share substantially identical aspects. As best shown in FIG. 5, each end 120 includes two substantially identical attachment arms 124. Although each end 120 of the support bar 104 according to the present embodiment includes two attachment arms 124, alternative configurations are possible. For example, in some embodiments, each end of a support bar may include at least one attachment arm. However, in some embodiments, use of two or more attachment arms may provide increased stability against rocking or other unintended displacement. Further, in some embodiments, a support body that is not configured as a support bar may also generally be used, according to the principles of adjustment and attachment disclosed herein.

Generally, support bodies according to the invention can include one or more attachment arms with mounting features that allow adjustable attachment to a mounting bracket. Still referring to FIG. 5, for example, each attachment arm 124 individually extends from the support section 122, thereby defining a central channel 126 therebetween. Each attachment arm 124 includes a first section 128 that is a parallel (e.g., coplanar) extension of the support section 122 and a second section 130 that extends substantially perpendicularly from the first section 128. Turning to FIG. 6, a plurality of slots 134 are disposed along lengths of each the attachment arms 124, on a central wall of a channel bounded by opposing lips 132. Although the plurality of slots 134 are equidistantly spaced along the lengths of the attachment arms 124 in the embodiment illustrated, alternative configurations are possible. For example, in some instances, the slots 134 may be randomly or otherwise non-uniformly spaced along the lengths of the attachment arms 124. In some embodiments, only one of a plurality of attachment arms may include slots. In some embodiments, other mounting features for adjustable attachments can be provided, such as an array of openings other than slots, an array of protrusions, recesses, and/or notches, and so on. Further, some embodiments may include slots or other features but may include only a single lip (e.g., similar to the lips 132) or no lip at all.

In some embodiments, as also noted above, mounting brackets can be configured to adjustably engage and secure support bars (e.g., the support bar 104) at any number of heights relative to a reference direction (e.g., vertically). For example, FIGS. 7-10 illustrate an example configuration of the mounting bracket 106 for use in the bracket system 100 of FIGS. 1 and 2 according to an embodiment of the invention. As further discussed below, the mounting bracket 106 can be used to selectively secure the arms 124 at any of a plurality of insertion distances relative to channels defined by the mounting bracket 106, which may correspond to any of a plurality of heights for the support bar 104 when the mounting bracket 106 is secured to a ceiling member.

Figure 7:
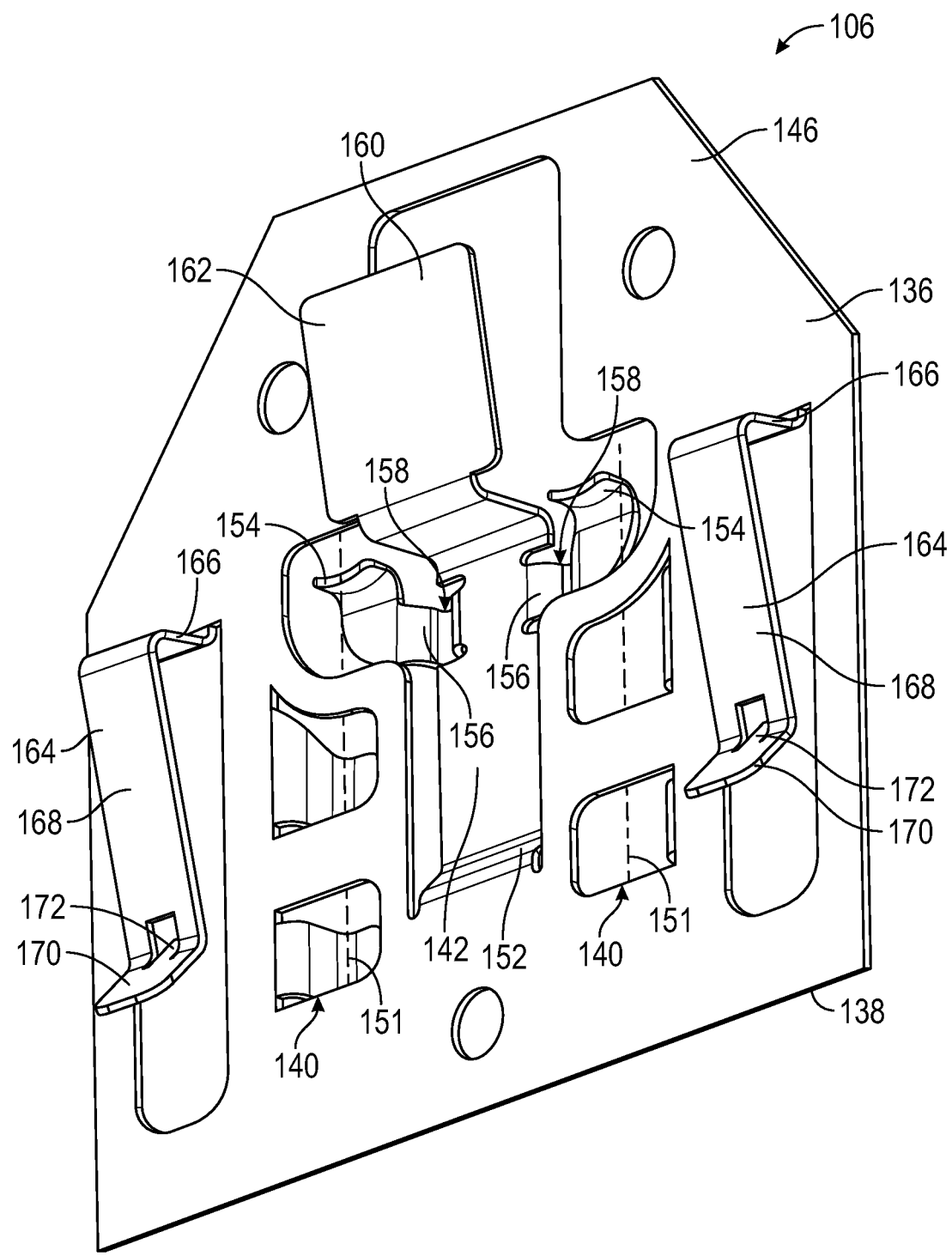
FIG. 7 is a rear isometric view of the mounting bracket of FIG. 1.

As illustrated, the mounting bracket 106 is formed as a stamping from a single blank of material, although a variety of other approaches are possible. With reference to FIG. 7 in particular, the mounting bracket 106 has a bracket body 136 that includes a support edge 138 and is configured to securely engage the ceiling member 108. Further, the bracket body 136 supports two channels defined by channel structures 140 and a locking arm 142 that are collectively sized and oriented to slidingly receive and selectively secure the support bar 104 (see FIG. 1). However, other configurations are possible, including configurations with only one channel or with one or more channels that are defined by different structures than the channel structures 140.

Figure 8:
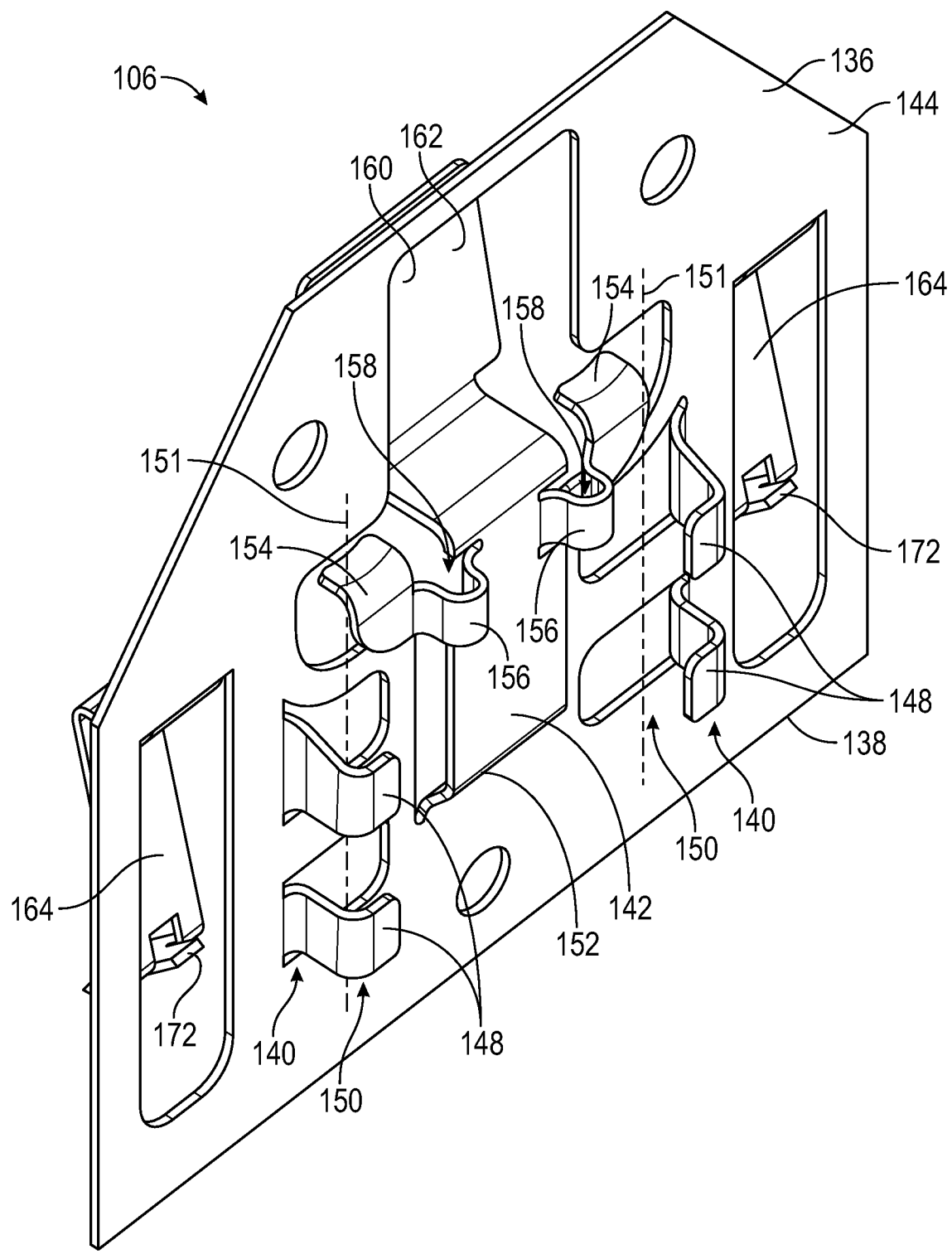
FIG. 8 is a front isometric view of the mounting bracket of FIG. 1.
Figure 9:
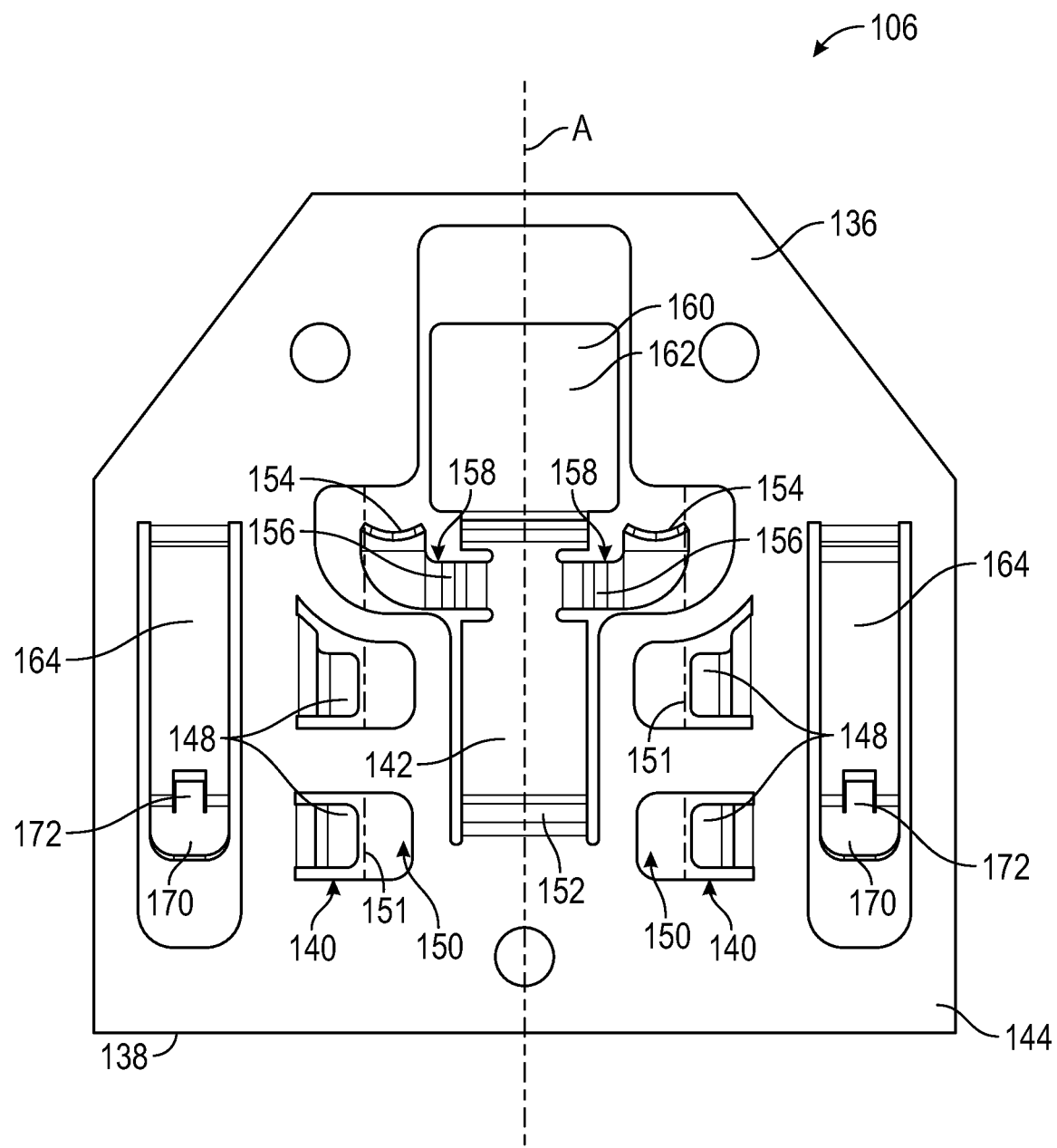
FIG. 9 is a rear side elevational view of the mounting bracket of FIG. 1.
Figure 10:
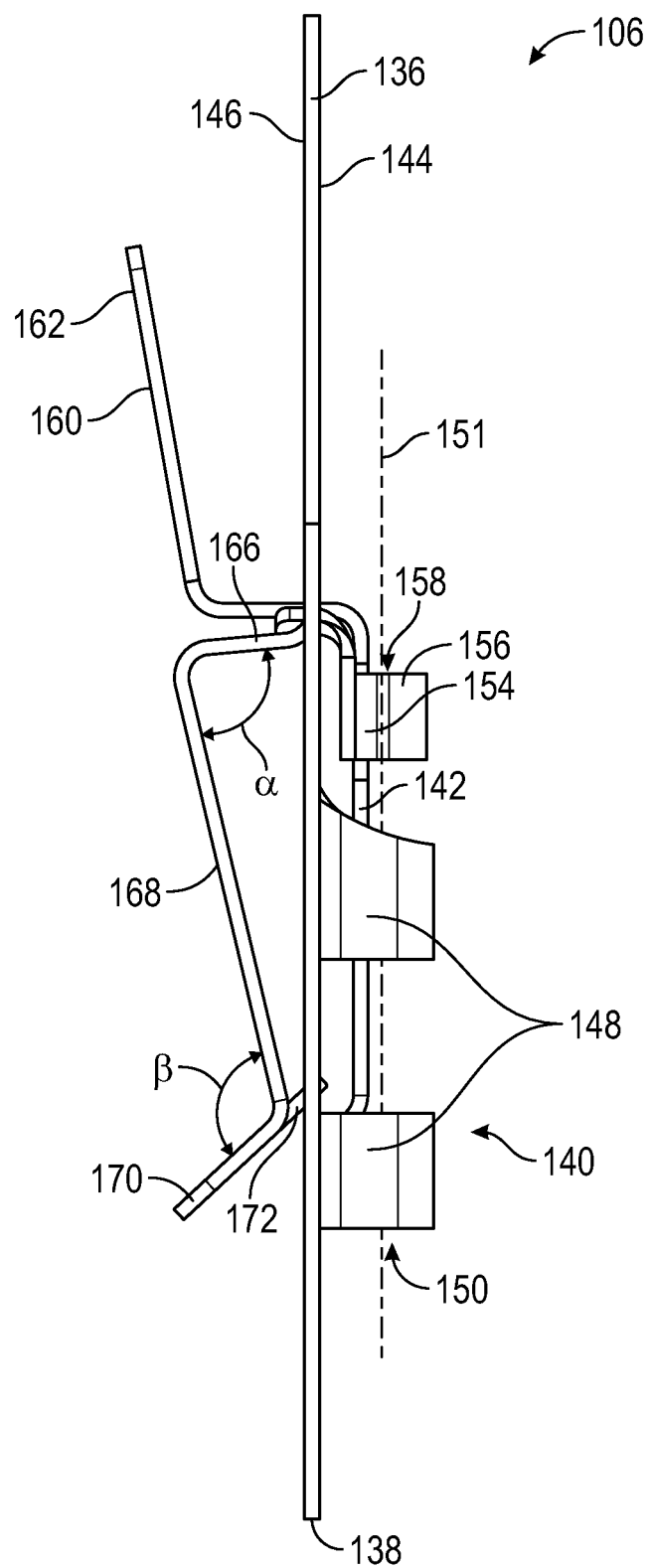
FIG. 10 is a left side elevational view of the mounting bracket of FIG. 1.

Referring also to FIG. 8, the bracket body 136 is an integrally formed, planar piece with a first side 144 and an opposing second side 146 (see FIG. 7). Further, the channel structures 140 are integrally formed with the bracket body 136 to extend on (and away from) the first side 144 thereof. The channel structures 140 are symmetrical about a center axis A (see FIG. 9) and each include a plurality of tabs 148, also referred to herein as guide tabs, that extend from the bracket body 136 to define a partly open channel profile 150. In particular, the tabs 148 on opposing lateral sides of the bracket body 136 bend to extend laterally toward each other and, accordingly, the partly open channel profiles 150 open toward each other.

Further, in the illustrated embodiment, the tabs 148 define spaced apart channel sections along an insertion axis 151, corresponding to an open, discontinuous channel profile for each of the two channels defined by the channel structures 140. The tabs 148 are also formed to extend over only two sides of a structure that is inserted through the relevant channel along the insertion axis 151.

Thus, for example, the tabs 148, in combination with the bracket body 136 and the locking arm 142 (as further discussed below) can provide an appropriately bounded channel for the attachment arms 124, while allowing for relatively efficient manufacturing and avoiding the potential over-constraint of a more extensively enclosed channel profile. In other embodiments, however, other configurations are possible. For example, in some embodiments, fully enclosed (e.g., pocket) channel structures can be formed, channel structures can be formed without spaced apart channel sections (e.g., to define continuous channels), or tabs that form part of a channel section can extend over more or fewer than two sides of an inserted structure.

Generally, mounting brackets according to embodiments of the invention can include a movable locking arm that can selectively secure (and release) an associated support bar against (and for) slidable adjustment relative to the mounting brackets. For example, in the illustrated embodiment of the mounting bracket 106, the locking arm 142 is a cantilevered spring arm that is attached to and extends from the bracket body 136 at a first end 152. From the first end 152, the locking arm 142 extends to a free end 160 that is configured as a manually engageable release tab 162 that extends at least partly to the second side 146 of the bracket body 136 (e.g., opposite the channel structures 140). The locking arm 142 also extends between the channel structures 140 to define further the partly open channel profiles 150, as may further increase efficiency in manufacturing and ease of operation.

In different embodiments, different locking features can be provided on a locking arm in order to selectively engage corresponding mounting features on a support bar (e.g., the slots 134 or other similar openings). For example, the locking arm 142 includes two locking tabs 154 that are supported on lateral extensions 156 of the locking arm 142 that extend from opposing sides thereof. Each of the lateral extensions 156 of the locking arms 142 is in alignment with a respective one of the channel structures 140 to further define the respective partly open channel profiles 150. More specifically, each of the lateral extensions 156 of the locking arms 142 extends transverse to and intersects the channel profiles 150, extending within and beyond the channel structures 140. As best seen in FIG. 7, each lateral extension 156 also defines a receiving channel 158 that opens to the second side 146 of the mounting bracket 106.

Through appropriate placement on the lateral extensions 156, each of the locking tabs 154 is also supported in alignment with a respective one of the channel structures 140, to be positioned to engage a corresponding mounting feature on an attachment arm of a support bar that has been inserted into the channel structure 140. In particular, the locking tabs 154 are configured to be positioned in axial alignment with the channel profiles 150 such that the locking tabs 154 may extend across the channel profile 150 or a projection of the channel profile 150 along the insertion axis 151. Engagement and movement of the locking arm 142 thus may bring the locking tabs 154 into and out of alignment with the channel profiles 150 to engage or release the attachment arms 124, as further described below.

In different embodiments, different structures can be provided to secure a mounting bracket to a ceiling member or other building structure. For example, still referring to FIG. 7, the mounting bracket 106 further includes two support arms 164 that are cantilevered spring arms integrally formed with the bracket body 136. Although the mounting bracket 106 according to the present embodiment includes two support arms 164, alternative configurations may provide a mounting bracket with at least one support arm. The support arms 164 each include a first portion 166 that extends to the second side 146 of the bracket body 136 substantially perpendicularly with the bracket body 136 and a second portion 168 that extends from the first portion 166 at a rest angle $\alpha$ (see FIG. 10). In the embodiment illustrated, the angle $\alpha$ is less than 90°. Each of the support arms 164 further include a release tab 170 that extends from the second portion 168 at a rest angle $\beta$ that is greater than the angle $\alpha$ (see FIG. 10). In the illustrated embodiment, each of the support arms 164 includes an engagement tab 172, formed as a coplanar extension opposite the release tab 170 that extends toward the first side 144 of the mounting bracket 106.

Figure 11:
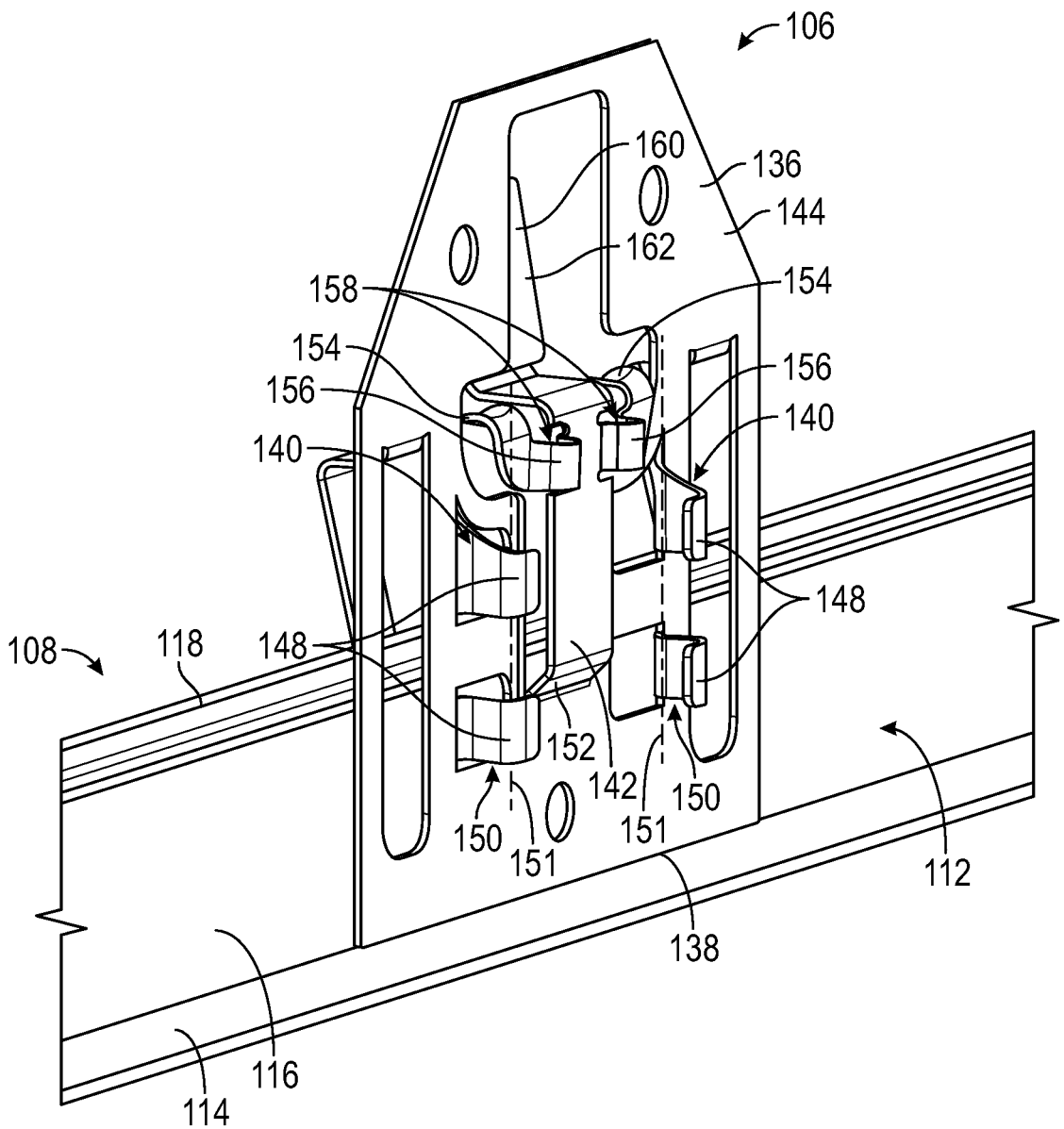
FIG. 11 is a front isometric partial view of the mounting bracket of FIG. 7 mounted to the ceiling member of FIG. 3.
Figure 12:
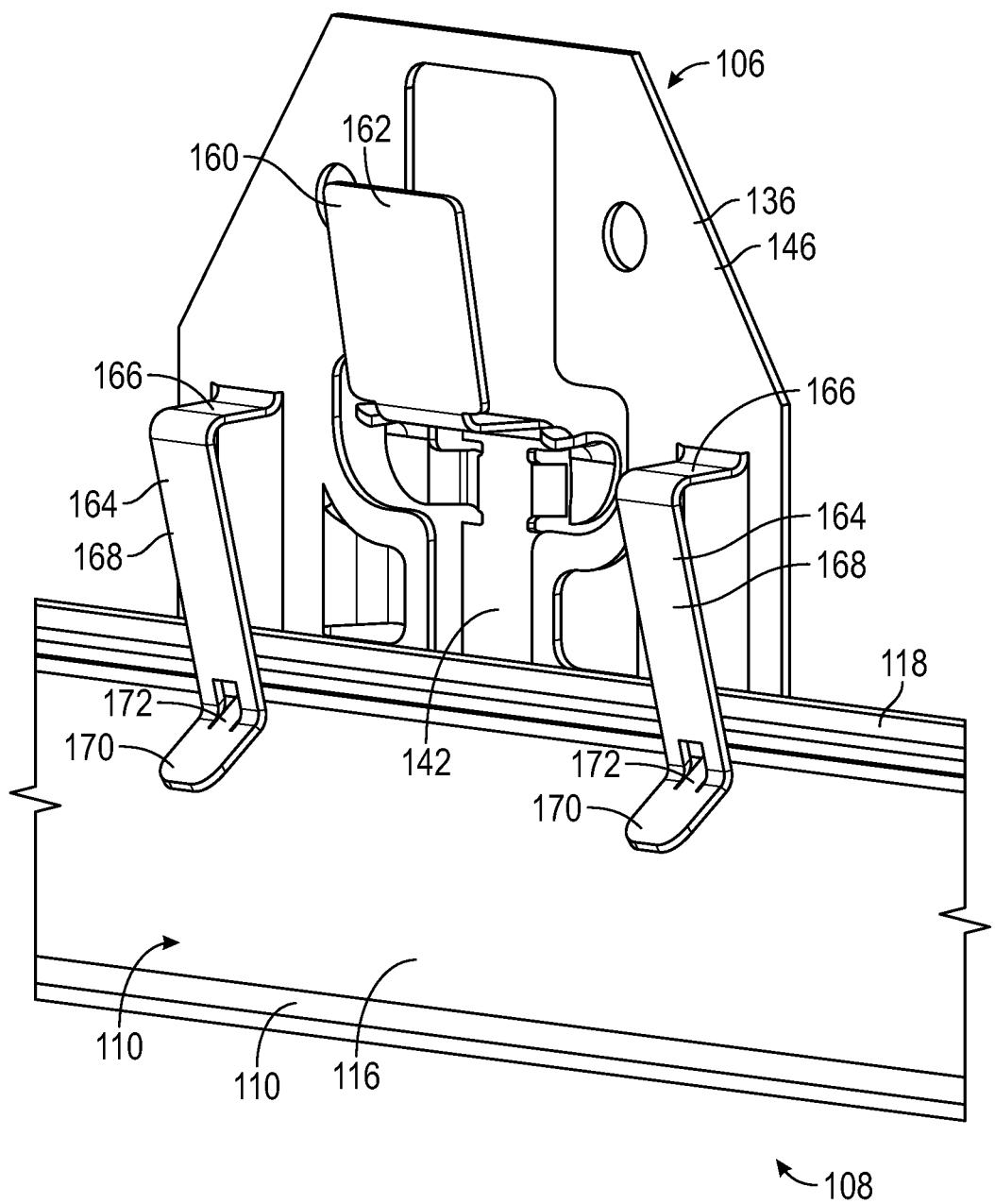
FIG. 12 is a rear isometric partial view of the mounting bracket of FIG. 7 mounted to the ceiling member of FIG. 3.

Referring to FIGS. 11 and 12, the mounting bracket 106 is configured to be slid (e.g., snapped) onto the ceiling member 108. In the embodiment illustrated, the bracket body 136 is configured to be disposed on the second side 112 of the ceiling member 108, opposite the support arms 164. Further, due to the height of the vertical stem 116, the support edge 138 contacts and is supported by the flat base 114 of the ceiling member 108 while the bracket body 136 contacts and is support by the widened top 118. In other installations, however, other sizes of ceiling members can be used, and the support edge 138 may not always contact a base of a ceiling member. Referring to FIG. 12 in particular, the support arms 164 of the mounting bracket 106 are configured to contact the widened top 118 on the first side 110 of the ceiling member 108. Accordingly, the engagement tabs 172 engage the widened top 118, thereby securing the mounting bracket 106 against removal from the ceiling member 108.

As the mounting bracket 106 is slid onto the ceiling member 108, the support arms 164 are configured to flex and pass over the widened top 118, and unflex to urge the engagement tabs 172 into engagement with the first side 110 of the ceiling member 108. To remove the mounting bracket 106 from the ceiling member 108, the release tabs 170 are configured to be manually engaged to flex the support arms 164 away from the first side 110 of the ceiling member 108 and thereby release the engagement tab 172 of the respective support arm 164 from engagement with the widened top 118.

Figure 13:
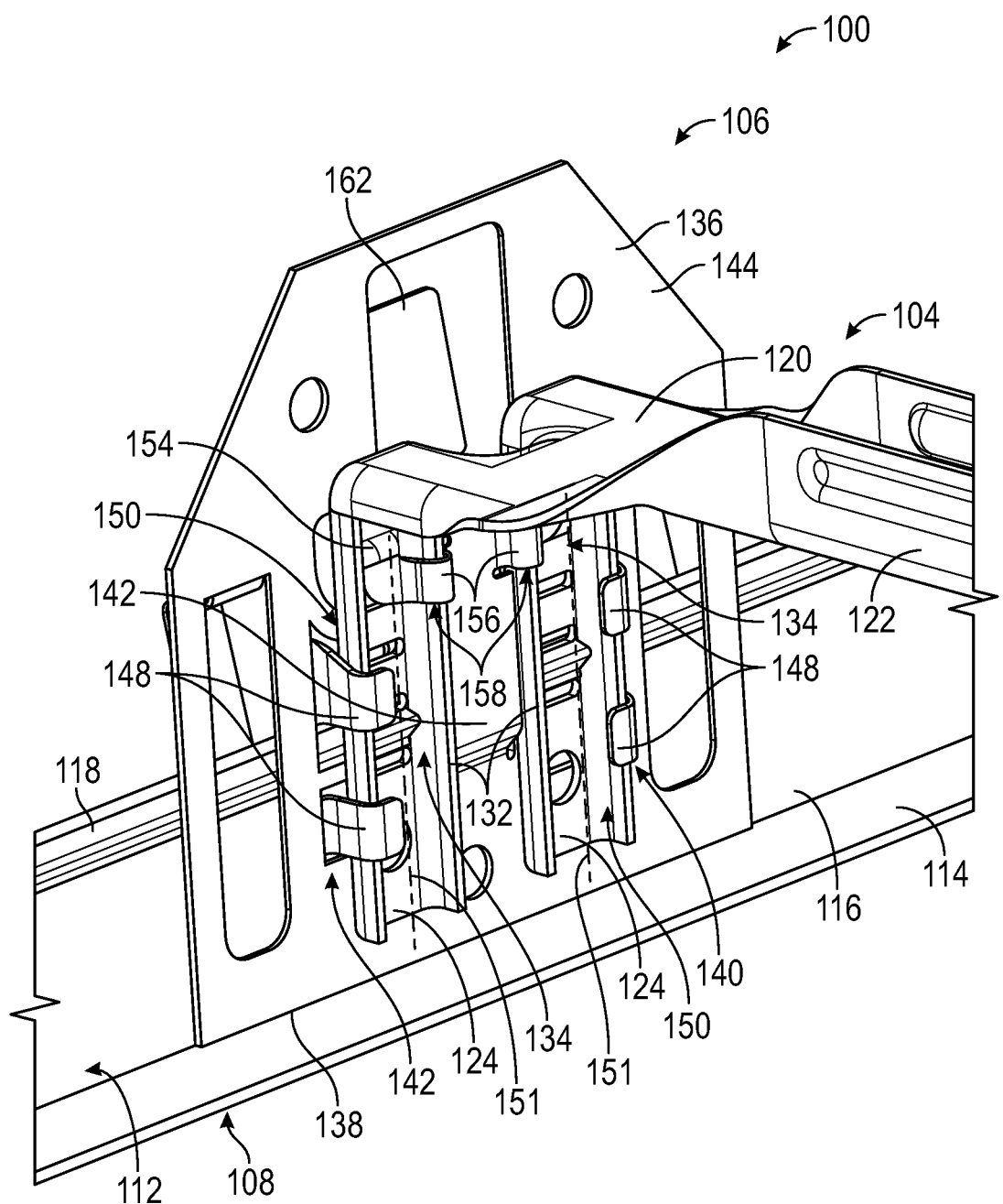
FIG. 13 is a front isometric partial view of the bracket system and the ceiling structure of FIG. 1.

Referring to FIG. 13, the mounting bracket 106 is configured to slidably receive and removably (and adjustably) secure one of the ends 120 of the support bar 104 without additional hardware, such as fasteners, on the first side 144 of the bracket body 136. Each of the partly open channel profiles 150 defined by the channel structures 140 is configured to receive and retain one of the attachment arms 124. Therefore, when assembled, each attachment arm 124 is removably secured in the partly open channel profile 150 defined by the respective channel structure 140.

More specifically, in the embodiment illustrated, the plurality of tabs 148 of each channel structure 140 partially wrap around the respective attachment arm 124, and the receiving channel 158 defined by each lateral extension 156 receives one of the lips 132 of the respective attachment arm 124 on an opposite side of the attachment arm 124 from the corresponding tabs 148. Further, due to the biased configuration of the locking arm 142, the locking tabs 154 extend into and engage an aligned respective one of the slots 134, when not actively held away from the attachment arms 124, to secure the corresponding attachment arm 124 against sliding movement within the corresponding channel. As appropriate, the locking tab 154 can also be selectively released and then reengaged with any one of the plurality of slots 134 disposed on the attachment arm 124, to selectively secure the locking arms 142 at a different predetermined insertion distance along the channel structures 150 (i.e., as shown, to secure the support bar 104 at a particular height). Accordingly, depending on the extent to which the attachment arm 124 is received within the channel structure 140, the mounting bracket 106 can selectively secure the support bar 104 at any of a plurality of heights relative to the mounting bracket 106 and the ceiling member 108.

Figure 14:
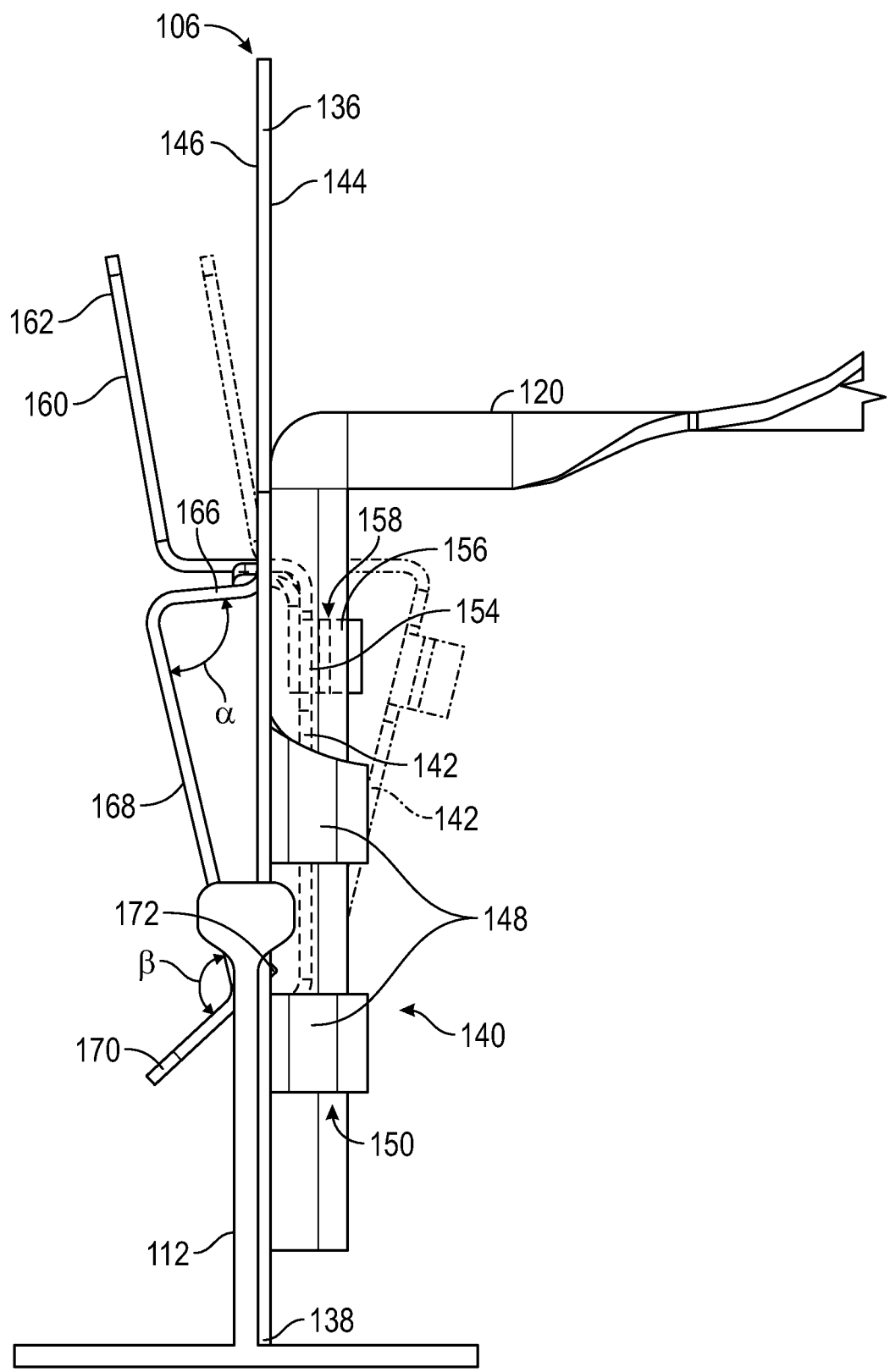
FIG. 14 is a left side elevational view of the bracket system and the ceiling structure of FIG. 1.
Figure 15:
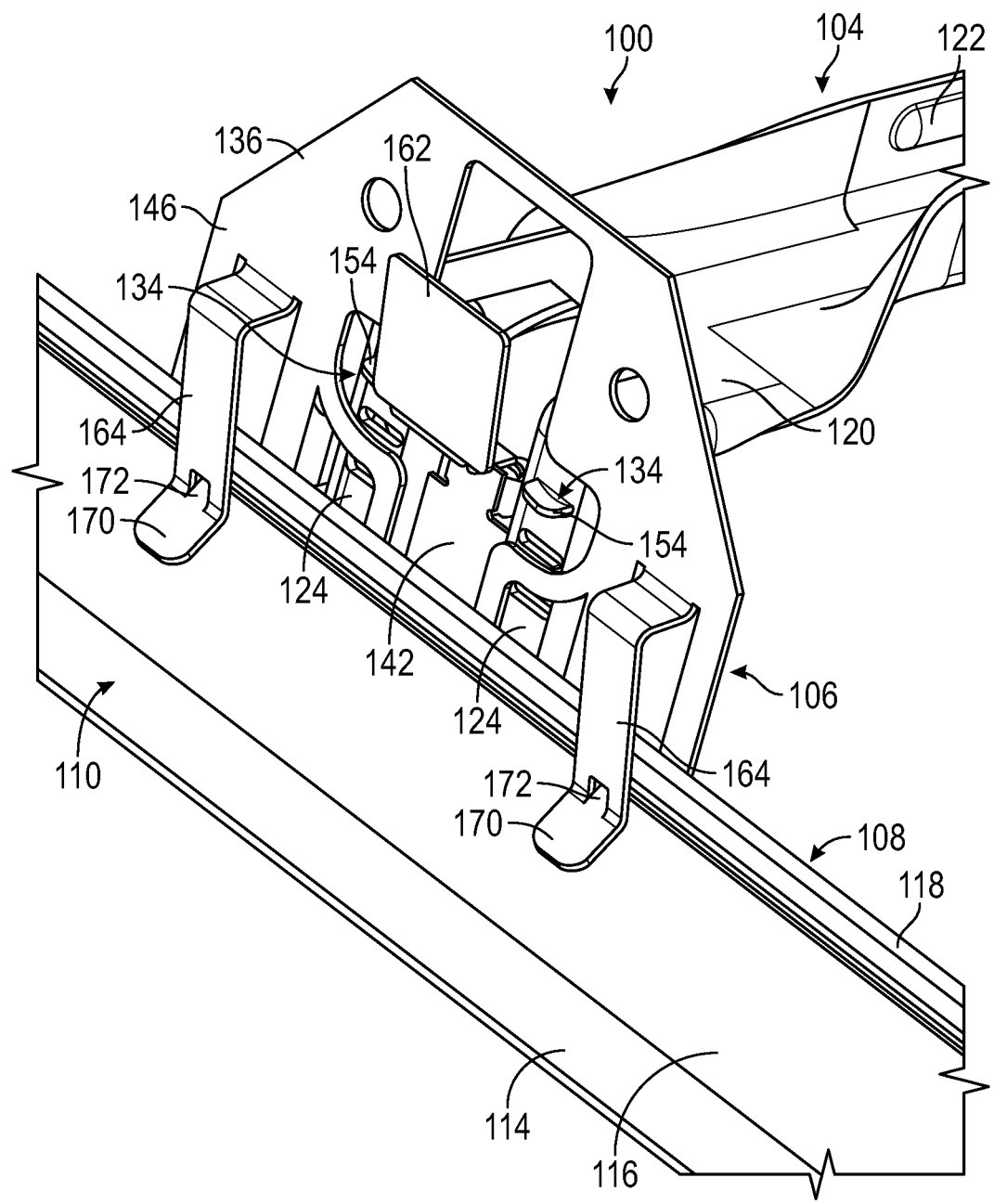
FIG. 15 is a rear isometric partial view of the bracket system and the ceiling structure of FIG. 1.

In the illustrated embodiment, the locking arm 142 is moveable relative to the bracket body 136 to simultaneously move the locking tabs 154 into or out of engagement with any one of a set of the slots 134 of the attachment arms 124, i.e., between an engaged position and a disengaged position. In the engaged position, the locking tabs 154 may be in a first alignment relative to the channel profiles 150, and, in the disengaged position (as shown in dash-dot-dash lines in FIG. 14), the locking tabs 154 may be in a second alignment relative to the channel profiles 150. In particular, in the illustrated embodiment, to allow the attachment arms 124 to be slidably inserted into the partly open channel profiles 150, the locking arm 142 is configured to be manually moved relative to the bracket body 136 from a rest configuration (see FIG. 10), to be at least partly clear of the partly open channel profiles 150, so that the attachment arms 124 can slide therein along the insertion axis 151. More specifically, the release tab 162 on the locking arm 142 is configured to be manually engaged from the second side 146 (see FIG. 15) of the bracket body 136 so that the locking arm 142 can flex on and away from the first side 144 toward a flexed configuration, and thereby displace the locking tabs 154 from the engaged position and the corresponding alignment with the channel structures 140 and the insertion axis 151. With the locking tabs 154 thus displaced, the attachment arms 124 can be inserted into the partly open channel profiles 150. The release tab 162 can then be released, so that the locking arm 142 springs resiliently back towards its rest configuration, to a locking configuration, and thereby biases the locking tabs 154 into a selected set of the slots 134 to secure the support bar 104 at a desired height relative to the mounting bracket 106, as illustrated by FIG. 14.

Figure 16:
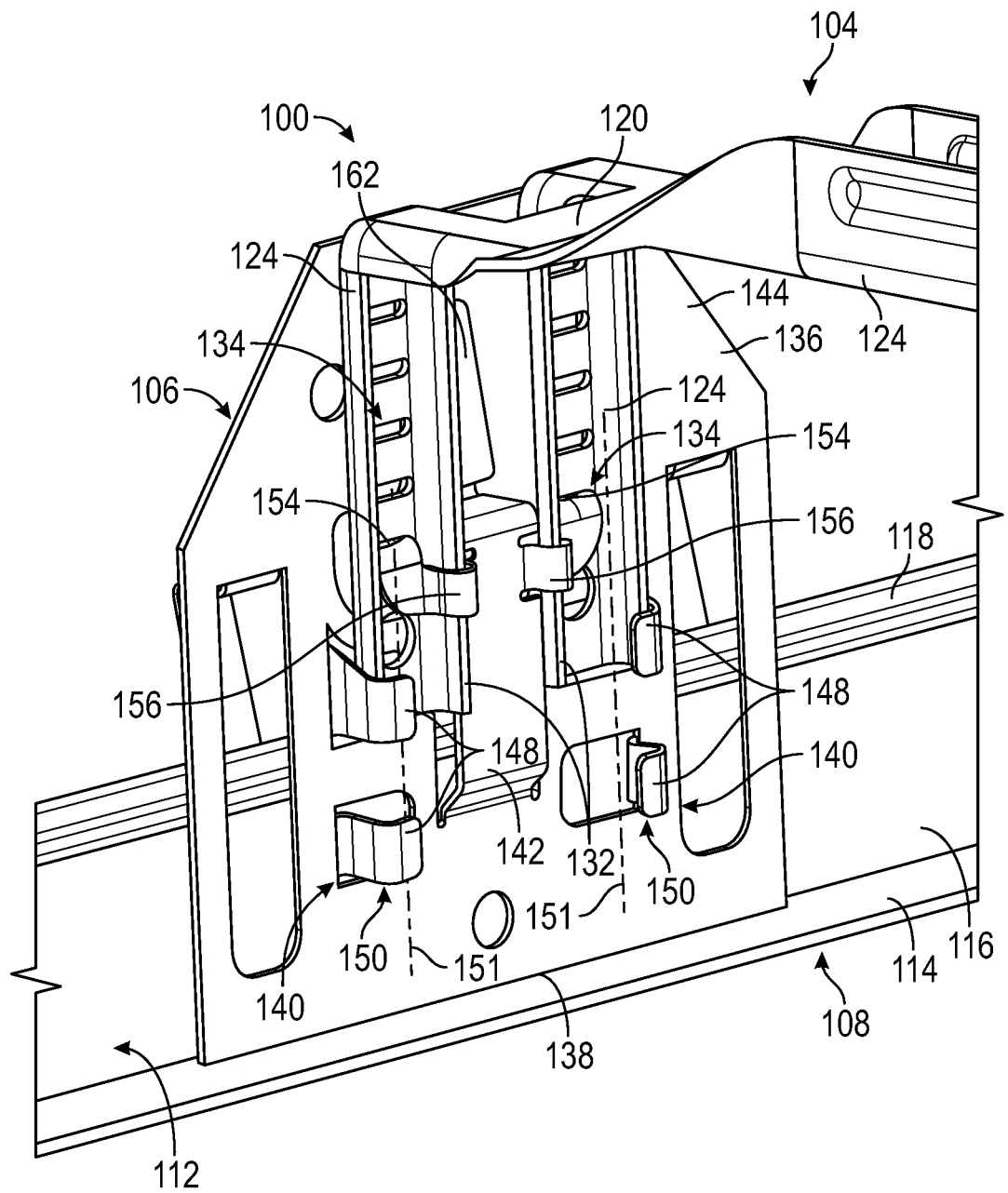
FIG. 16 is a front isometric partial view of the bracket system and the ceiling structure of FIG. 1.

In some embodiments, a support bar can be initially secured at a particular height (e.g., for transport) and then can be adjusted along an insertion axis to a different height for final installation. For example, still referring to FIG. 14, when each locking tab 154 is disposed in any one of the plurality of slots 134, the release tab 162 still extends to the second side 146 of the bracket body 136. Therefore, to disengage the locking tabs 154 from the slots 134 of the attachment arms 124, the release tab 162 can be manually engaged from the second side 146 of the bracket body 136, thereby flexing the locking arm 142 away from the attachment arms 124 and moving the locking tabs 154 out of engagement with the slots 134 of the attachment arms 124. Disengagement of the locking tabs 154 allows the support bar 104 to be repositioned to any of a plurality of alternate heights relative to the mounting bracket 106, an example of which is shown in FIG. 16. As similarly noted above, the release tab 162 can then be released so that the locking tabs 154 can secure the support bar 104 at the repositioned height.

Thus, embodiments of the invention can provide improved mounting devices for electrical boxes or other components. In some embodiments, for example, an improved mounting system according to the invention may not need fasteners or added hardware and may provide height adjustment capabilities. Thus, for example, it may be relatively easy to use a single mounting system to mount electrical boxes (or other objects) that have a wide range of depths.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A method for manufacturing a bracket system that secures an electrical device to a ceiling structure, the method comprising:
   forming a mounting bracket of the bracket system that is configured to be removably secured to a ceiling member of the ceiling structure by:
      forming a bracket body of the mounting bracket;
      integrally forming with the bracket body a channel structure that defines a channel of the mounting bracket and extends to a first side of the bracket body;
      integrally forming with the bracket body a support arm that defines an opening to removably engage the ceiling member; and integrally forming a locking arm with the bracket body that extends to a second side of the bracket body, opposite the first side, and that is movable relative to the bracket body and the channel between first and second alignments relative to the channel.

2. The method of claim 1, wherein the channel structure of the mounting bracket extends discontinuously along an insertion direction and includes at least two guide tabs that extend integrally from the bracket body to collectively define the channel as a partly open channel.

3. A method for manufacturing a bracket system that secures an electrical device to a ceiling structure, the method comprising:
forming a mounting bracket of the bracket system, stamped from a single blank of material, that is configured to be removably secured to a ceiling member of the ceiling structure by:
forming a bracket body of the mounting bracket;
integrally forming with the bracket body a channel structure that defines a channel of the mounting bracket;
integrally forming with the bracket body a support arm that defines an opening to removably engage the ceiling member; and
integrally forming a locking arm with the bracket body that is movable relative to the bracket body and the channel between first and second alignments relative to the channel.

4. The method of claim 3, further comprising:
integrally forming a support bar of the bracket system, the support bar including:
a support section to support the electrical device; and
an attachment structure that extends integrally from a first end of the support section, including an attachment arm to be slidably received within the channel of the mounting bracket in an insertion direction.

5. The method of claim 4, wherein the attachment arm has a U-shaped profile defined by a central arm wall and opposing arm lips that extend from the central arm wall toward the support section.

6. The method of claim 5, wherein the support section of the support bar has a U-shaped profile defined by a central bar wall bounded by opposing bar lips that extend from the central bar wall in a direction that is opposite the insertion direction.

7. The method of claim 6, wherein attachment structure includes a first section that extends from the support section and a second section that extends transverse to the first section and to the support section, the second section including the attachment arm.

8. The method of claim 5, wherein a plurality of openings is disposed along the central arm wall; and
wherein, with the attachment arm of the support bar received in the channel structure of the mounting bracket, the locking arm of the mounting bracket is movable relative to the bracket body between:
an engaged position, in which the locking arm is aligned to engage any one of the plurality of openings on the attachment arm, depending on a distance of insertion of the attachment arm in the insertion direction; and
a disengaged position, in which the locking arm is aligned to release the attachment arm from the channel structure.

9. The method of claim 4, wherein the channel of the mounting bracket is a first channel and the channel structure further defines a second channel; and wherein the attachment arm of the support bar is a first attachment arm and the support bar further includes a second attachment arm that extends integrally from the first end of the support section to be slidably received within the second channel of the mounting bracket in the insertion direction.

10. The method of claim 9, wherein the attachment structure of the support bar is a first attachment structure and the support bar further includes:
a second attachment structure that extends integrally from a second end of the support section, including a third attachment arm and a fourth attachment arm to be slidably received within channels of a second mounting bracket.

11. The method of claim 3, wherein the channel structure of the mounting bracket extends discontinuously along an insertion direction and includes at least two guide tabs that extend integrally from the bracket body to collectively define the channel as a partly open channel.

12. A method of securing an electrical device to a ceiling structure, the method comprising:
securing a first mounting bracket of a bracket system to a first ceiling member of the ceiling structure and securing a second mounting bracket of the bracket system to a second ceiling member of the ceiling structure;
slidably inserting a first attachment arm of a support bar of the bracket system into a first channel structure of the first mounting bracket and a second attachment arm of the support bar into a second channel structure of the second mounting bracket, the first attachment arm extending integrally from a first end of a support section of the support bar and the second attachment arm extending integrally from a second end of the support section;
securing the first attachment arm at a selected first height of a plurality of first heights relative to the first mounting bracket, with an integrally formed first locking arm of the first mounting bracket that biasingly engages one of a plurality of first openings of the first attachment arm that corresponds to the selected first height;
securing the second attachment arm at a selected second height of a plurality of second heights relative to the second mounting bracket with an integrally formed second locking arm of the second mounting bracket that biasingly engages one of a plurality of second openings of the second attachment arm that corresponds to the selected second height; and
securing the electrical device to the support section of the support bar.

13. The method of claim 12, further comprising:
adjusting the second attachment arm to a selected third height of the plurality of second heights relative to the second mounting bracket by moving the second locking arm of the second mounting bracket to disengage from the one of the plurality of second openings and biasingly engage a different one of the plurality of second openings of the second attachment arm that corresponds to the selected third height.

14. The method of claim 12, further comprising:
transporting the bracket system to an installation site with the first attachment arm at the selected first height and the second attachment arm at the selected second height; and
at the installation site, providing a final installation height for the support bar by one or more of:
adjusting the first attachment arm to a first different height of the plurality of first heights; or adjusting the second attachment arm to a second different height of the plurality of second heights.

15. The method of claim 12, wherein the first attachment arm is slidably received within the first channel structure of the first mounting bracket in a first insertion direction, and the second attachment arm is slidably received within the second channel structure of the second mounting bracket in a second insertion direction that is substantially parallel to the first insertion direction.

16. The method of claim 12, wherein the support bar further includes a third attachment arm extending integrally from the first end of the support section adjacent to the first attachment arm, the method further comprising:
   slidably inserting the third attachment arm into a third channel structure of the first mounting bracket; and
   securing the third attachment arm at the selected first height relative to the first mounting bracket with an integrally formed third locking arm of the first mounting bracket that biasingly engage one of a plurality of third openings of the third attachment arm that corresponds to the selected first height.

17. The method of claim 16, wherein the support bar further includes a fourth attachment arm extending integrally from the second of the support section adjacent to the second attachment arm, the method further comprising:
   slidably inserting the fourth attachment arm into a fourth channel structure of the second mounting bracket; and
   securing the fourth attachment arm at the selected second height relative to the second mounting bracket with an integrally formed fourth locking arm of the first mounting bracket that biasingly engage one of a plurality of fourth openings of the fourth attachment arm that corresponds to the selected second height.

18. A bracket system for securing an electrical device to a ceiling structure that includes a ceiling member, the bracket system comprising:
   a mounting bracket that is removably securable to the ceiling member, the mounting bracket including:
      a bracket body;
      a channel structure extending integrally from the bracket body that defines a channel of the mounting bracket;
      a support arm extending integrally from the bracket body to removably engage the ceiling member; and
      a locking arm extending integrally from the bracket body and being movable relative to the bracket body; and
   a support bar that removably engages the mounting bracket, the support bar including:
      a support section configured to support the electrical device; and
      an attachment arm extending integrally from a first end of the support section, the attachment arm being slidably receivable within the channel of the mounting bracket in an insertion direction;
      wherein the channel structure of the mounting bracket extends discontinuously along the insertion direction and includes at least two guide tabs that extend integrally from the bracket body to collectively define the channel.

19. The bracket system of claim 18, wherein the attachment arm includes a U-shaped profile that is received into the channel of the mounting bracket, defined by a central wall bounded by opposing lips that extend from the central wall toward the support section.

20. The bracket system of claim 18, wherein channel is a first channel and the channel structure includes at least two further guide tabs that extend integrally from the bracket body to collectively define a second channel to receive a second attachment arm of the support bar.

* * * * *